May 29, 1934. C. W. EGGENWEILER ET AL 1,960,483
METHOD OF COATING BEARINGS AND THE LIKE
Original Filed April 26, 1926  5 Sheets-Sheet 2
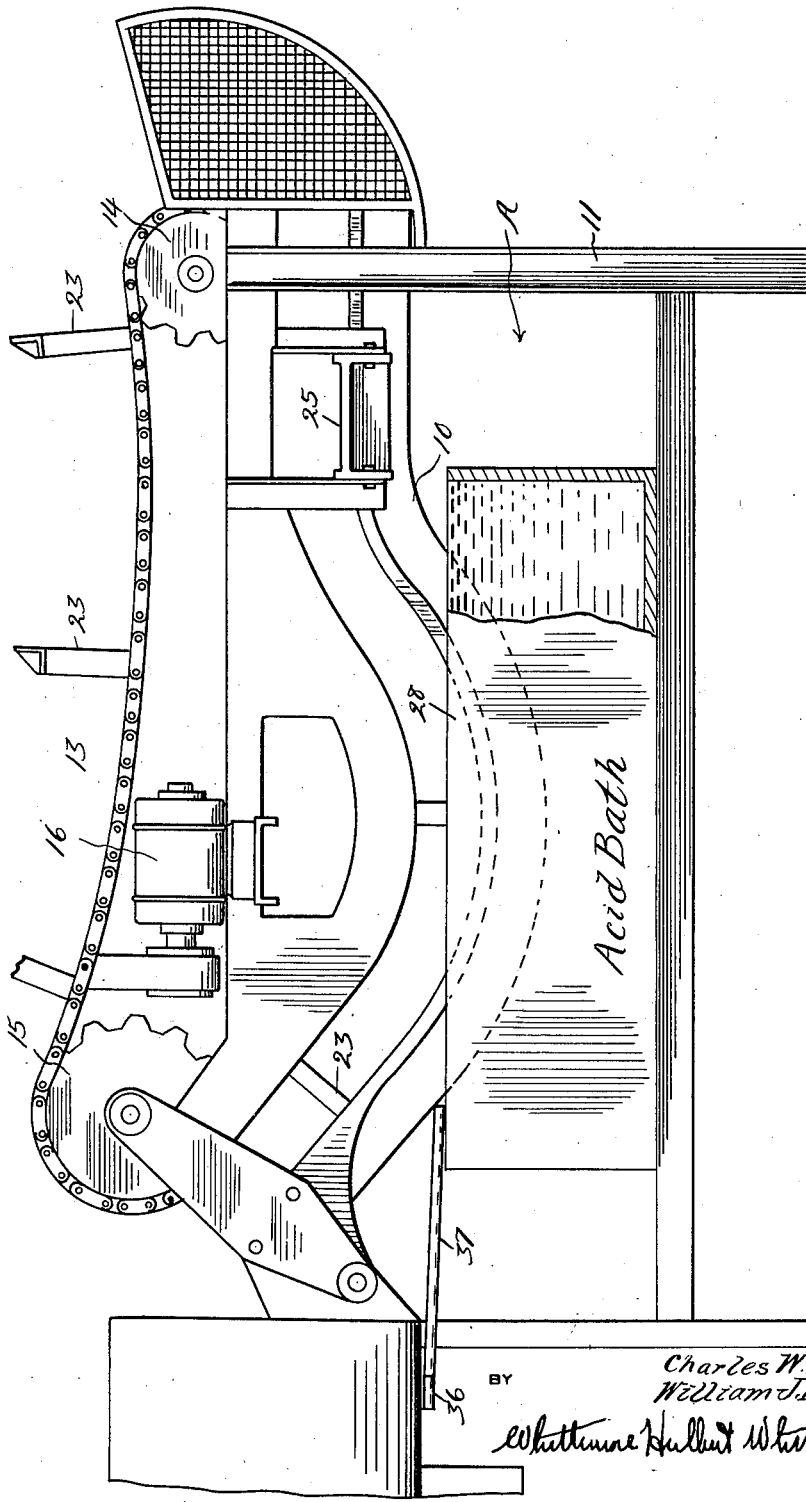

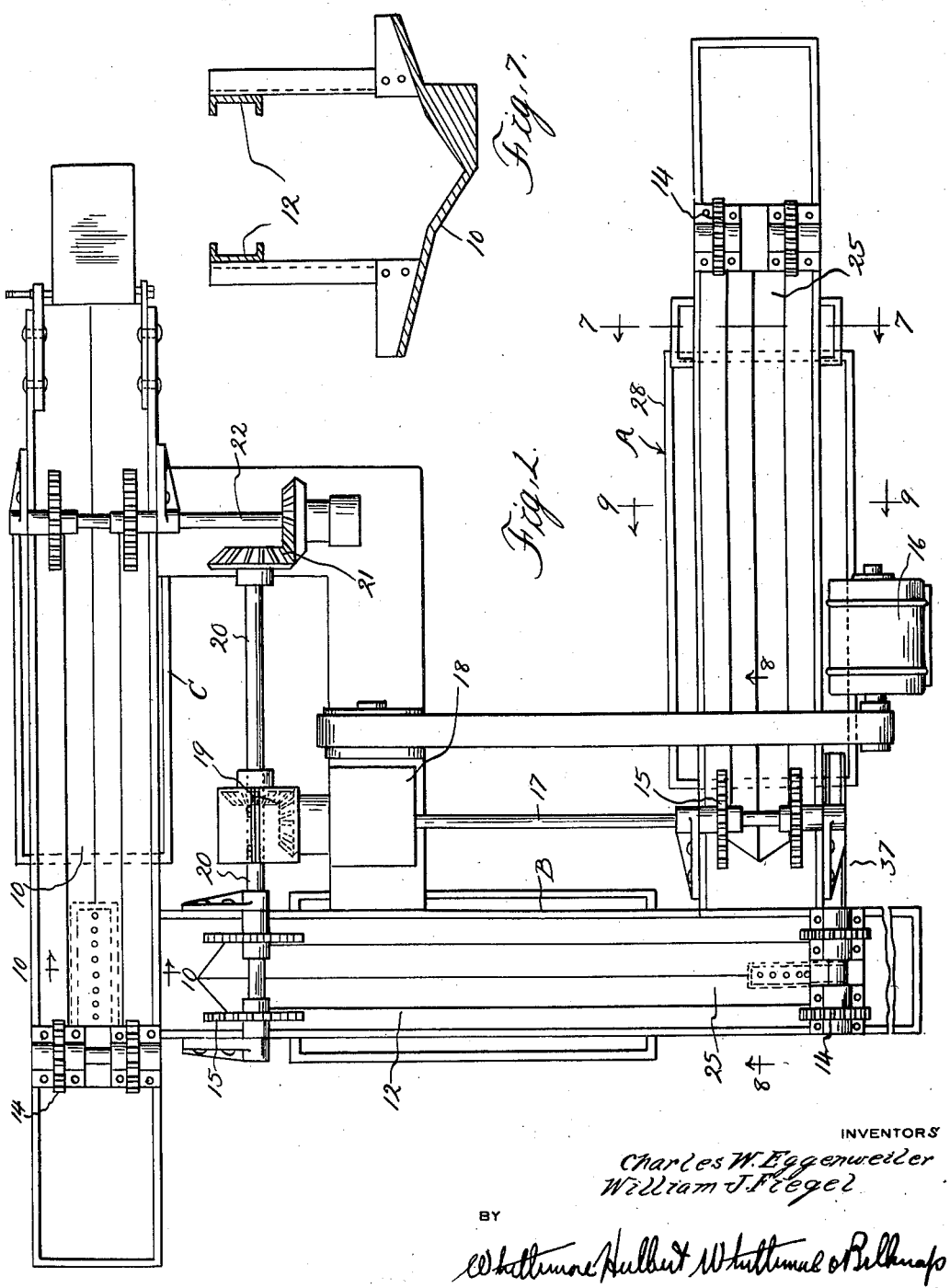

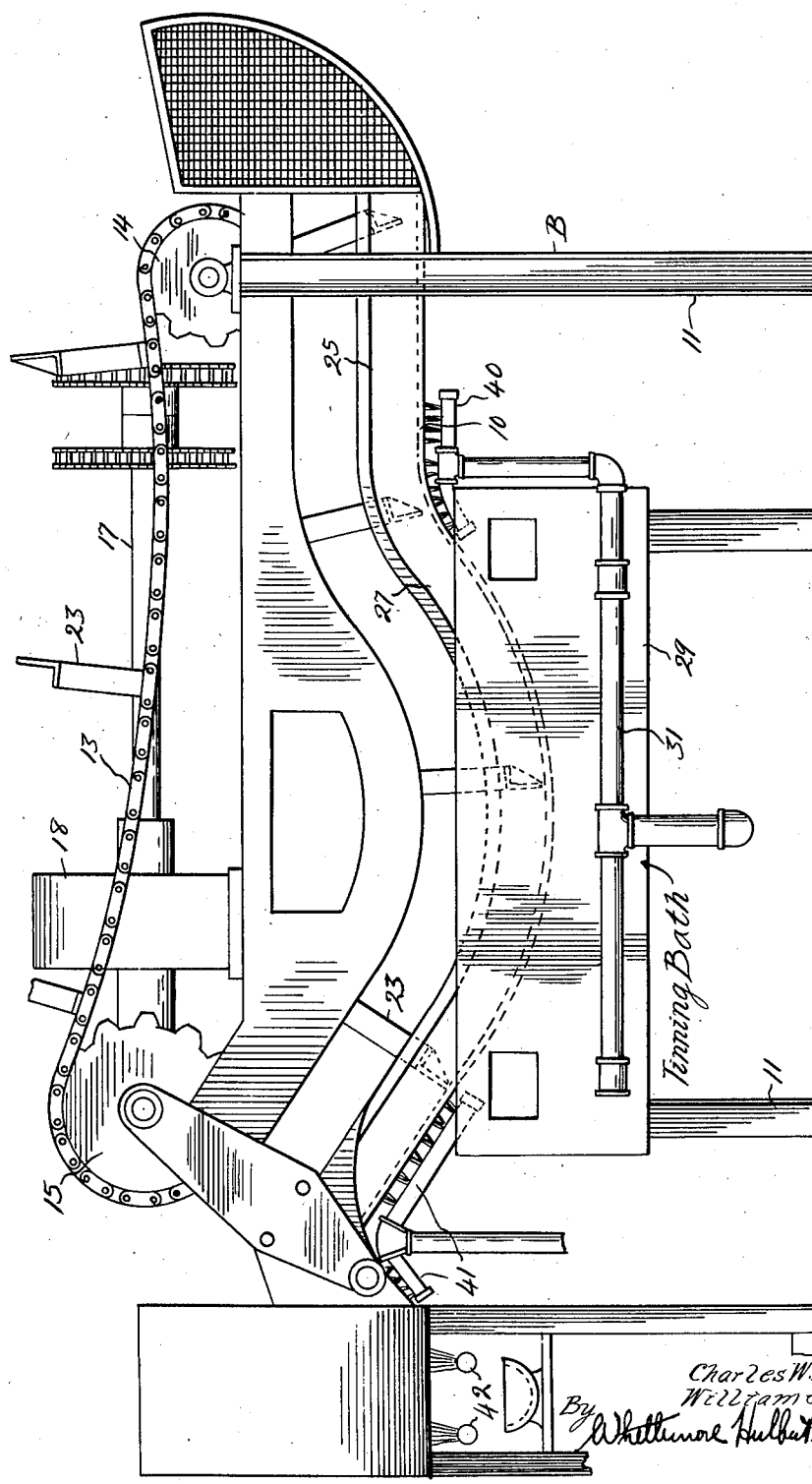

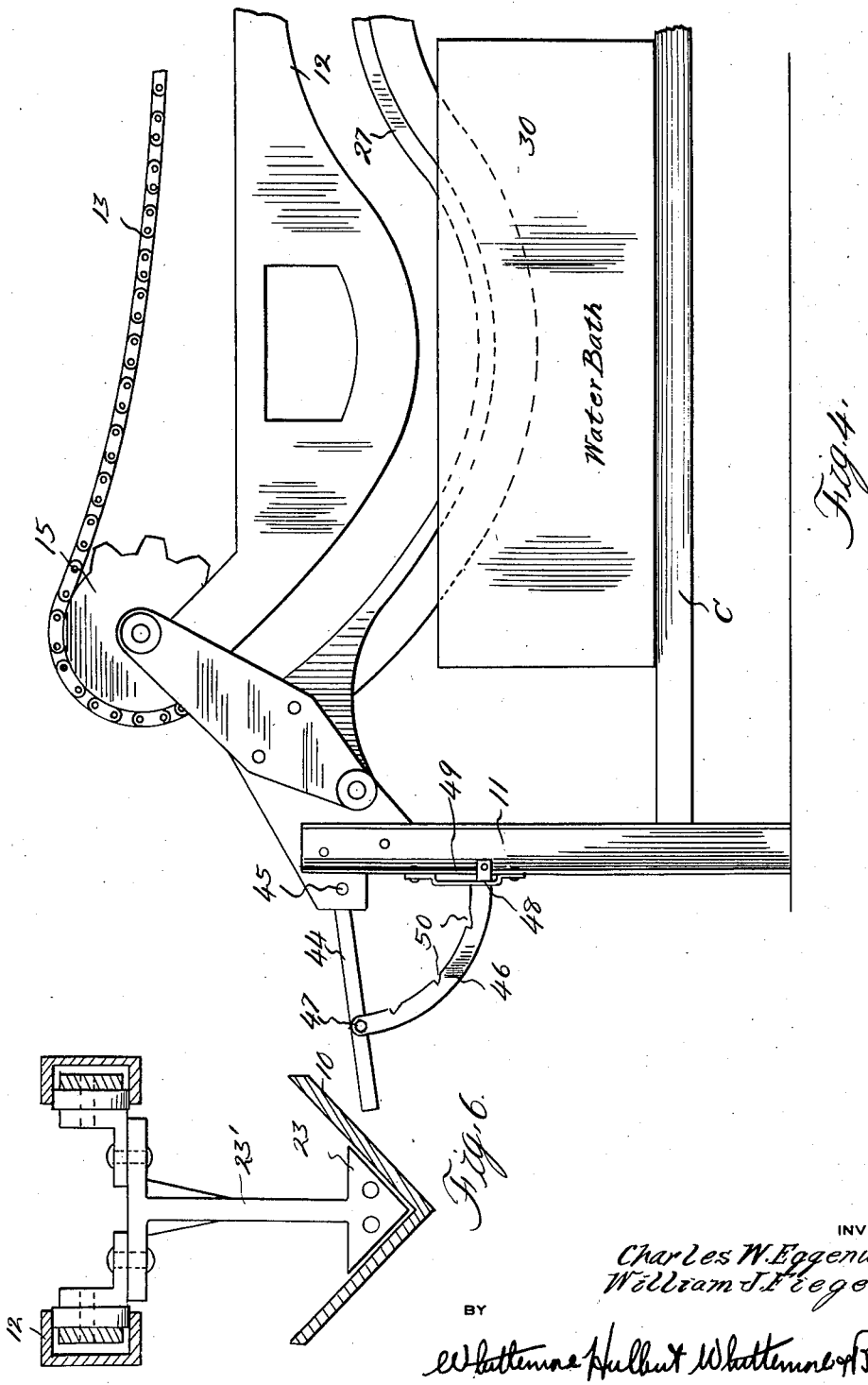

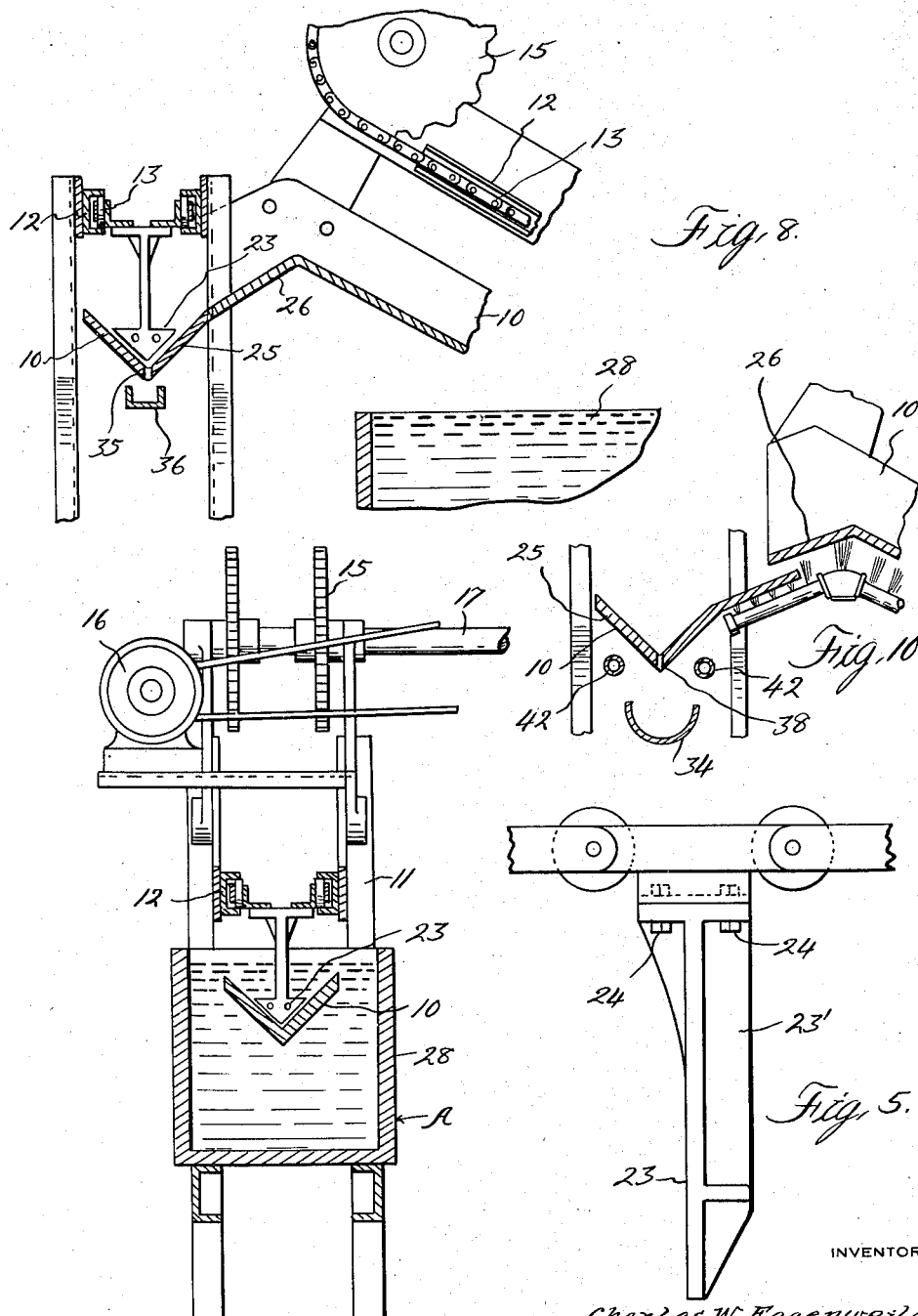

Patented May 29, 1934

1,960,483

UNITED STATES PATENT OFFICE 1,960,483

METHOD OF COATING BEARINGS AND THE LIKE

Charles W. Eggenweiler and William J. Fiegel, Detroit, Mich., assignors to Bohn Aluminum and Brass Corporation, Detroit, Mich., a corporation of Michigan Original application April 26, 1926, Serial No. 104,755. Divided and this application October 21, 1929, Serial No. 401,354

9 Claims. (Cl. 91—70.2)

The invention relates to the coating art and refers more particularly to an improved method for coating bearings or the like preparatory to the application of the usual babbitt or other lining material. Brass or similarly alloyed bearings cannot readily be lined with babbitt without first coating the bearings with tin or like material. Thus by subjecting the bearings to a solution of molten tin, the tin acts chemically on the brass replacing the copper of the brass. Bearings cast in the usual manner contain a certain amount of air and moisture, water frequently being present in amounts of from ten to fifteen drops in a casting of the size ordinarily employed for connecting rod bearings or motor vehicle engines. The presence of this amount of moisture and air makes the bearings float in the tin bath until the air and moisture are driven out, at which time, the bearings will be of such relative density as to sink in the tin bath. The higher the temperature of the tin bath the more accelerated is the chemical action of the tin coating and the more accelerated is the loading of the solution with the copper from the brass bearings. As the solution becomes loaded with the copper the temperature must be raised in order to obtain effective coating since the presence of copper in increasing amounts in the solution renders the same less active. It is important, therefore, to keep the temperature of the tin solution down. However, the lower the temperature of the tin bath the slower is the process of driving off the water and the air in the casting, with the result that there is a tendency to remove the bearings from the tin solutions before they sink, the bearings under such conditions not being properly coated with the tin.

One of the objects of the invention is to provide a method for coating the bearings wherein the bearings are automatically removed from the tin bath upon their sinking, at which time the tin coating will be just right with the air and water driven out of the casting and the castings will also be thoroughly heated.

This application is a division of my Patent Number 1,735,534, filed April 26, 1926.

With these and other objects in view, the invention resides in the novel method, features of construction and combination and arrangements of parts as more fully hereinafter described and claimed.

Referring to the drawings in which like reference characters indicate corresponding parts:

Figure 1 is a plan view showing the machine;

Figure 2 is a side elevational view thereof showing in detail the acid bath apparatus;

Figure 3 is a similar view showing in detail the tinning bath apparatus;

Figure 4 is a similar view showing in detail the water bath apparatus;

Figure 5 is a detail side elevation view of a fragment of the endless chain carrier showing a pedal applied thereto;

Figure 6 is an elevation view at right angles with the chain fragment as shown in Figure 4;

Figure 7 is a detail sectional view taken substantially on the plane indicated by the line 7—7 in Figure 1;

Figure 8 is a sectional view taken on line 8—8 in Figure 1;

Figure 9 is a sectional view taken on line 9—9 in Figure 1; and

Figure 10 is a sectional view taken on line 10—10 in Figure 1.

The machine preferably comprises a plurality of units A, B and C sufficient in number to accommodate the various steps involved in the tinning operation. For simplicity and convenience of manufacture, these units are preferably substantially identical in general construction, the unit B as shown in Figure 3 being typical. Thus the units are constructed of a trough 10 substantially V-shaped and supported by suitable standards 11 which comprises the main supporting frame of the machine. 12 denotes a channel guide for the carrier, this guide being positioned above the trough 10 and following the general direction of the trough. Guided within the channel 12 is a carrier 13 which is of a chain-like endless carrier, this carrier at one end passing around the idler sprockets 14 and at the other end passing around the power driven sprockets 15.

16 represents a suitable source of power such as a motor which drives the main power shaft 17 preferably through a reduction gearing 18. The power shaft 17 imparts rotative power directly to the drive sprockets 15 of the unit A and also to the drive sprockets of the unit B through gearing 19 and shaft 20. Likewise, the drive sprockets of the unit C are driven from shaft 20 through gearing 21 and shaft 22 as will be readily understood.

Referring again to the typical unit B the carrier 13 thereof is provided at suitable spaced points throughout its length with pedals 23, which as shown in Figures 5 and 6, particularly, are secured by suitable anchors 24 to the desired links of the carrier chain. These pedals are also preferably substantially V-shaped to conform with the trough 10, the guide 12 being constructed in relation to the trough so as to guide the pedals 23 within the trough and slightly spaced therefrom whereby the bearings or the like are moved longitudinally of the trough.

The trough 10 of each unit is formed at one end with a bearing receiving portion 25 and at the other end with a downwardly inclined bearing discharged portion 26, the portion 26 of each trough being positioned to discharge the bearings from the trough of one unit to the receiving portion 25 of the adjacent unit. Intermediate the end portions 25 and 26 the troughs 10 have a downwardly extending portion 27 which serves to lower the bearings into the tanks 28, 29 and 30 of the units A, B and C respectively. In the tank 28 is a suitable substance such as zinc chloride providing an acid bath for the bearings preparatory to their introduction into the tank 29 of the unit B. In this latter tank is placed the tin bath which is maintained at the desired molten temperature by suitable heating means such as the gas burner 31. For reasons aforesaid, it is desirable to maintain the temperature of the tin bath at approximately less than 650° F. The tank 30 is adapted to contain a suitable substance for cooling the bearings, such as water.

As the bearings leave the trough 10 associated with the acid bath in tank 28 of unit A, it is desirable that all excess acid be freed therefrom so as to reduce the quantity of acid used and to prevent the same from being carried in large quantities to the tinning bath. Each bearing is freed from all excess acid, such as might adhere thereto in the form of drops, upon its discharge into the receiving end 25 of the trough 10 associated with the tinning bath. By particular reference to Figure 8 it will be noted that the discharge end 26 of the acid bath trough 10 is in a higher plane than the receiving portion 25 of the tinning bath trough 10 so that the bearings tumble down into the trough 10 by gravity and strike the sides thereof with sufficient force to free or knock off this excess acid. This acid collects in the bottom of the trough and passes therefrom through one or more openings 35 into the receiving portion 36 of a gutter or trough arranged thereunder. One leg 37 of this receiving gutter extends laterally with respect to the leg 36 to a point over the acid bath trough 28 whereby the collected excess acid is returned to this trough. If desired, the leg 37 of the collecting gutter will be slightly inclined to facilitate the flowing of this accumulated acid back to the trough 28.

As the bearings leave the tinning bath in tank 29 they frequently carry excess amounts of tin in the forms of drops or accumulations and obviously it is also desirable to free the bearings from this excess tin, not only for the purpose of making the tin coating more uniform throughout, but also for the purpose of economizing in the tin. The discharge end 26 of the trough 10 associated with the tin bath is arranged in a higher plane than the receiving end 25 of the trough 10 associated with the cooling bath so that as the coated bearings leave the tinning bath and discharge into the receiving end of the cooling bath trough, they tumble by gravity downwardly on to the cooling bath trough and strike the same with considerable force sufficient to knock off or free the same from the accumulated excess tin. This tin collects in the bottom of the trough 10 and passes through one or more apertures 38 into an ingot 39 arranged thereunder. This ingot is removably supported so that as the same becomes filled with the accumulated excess tin it may be removed and dumped into the tinning bath tank 29.

It is important that the temperature of the tinning bath trough 10 and of the receiving end of the cooling bath trough be maintained at such a temperature as to prevent the solidifying of any of the tin bath which might come in contact therewith either by reason of the splash of the tin as the bearings tumble into the tank 29 or by reason of the tin carried by or freed from the bearings as they leave the tank. Obviously that portion of the trough 10 in immediate proximity with the heating means associated with the tinning bath will be maintained at this desired high temperature but in addition to this heating means we provide one or more additional burners 40 arranged in proximity to that portion of the tinning bath trough immediately adjacent the entrance end of the tank 29 so that tin splashed thereon as the bearings tumble into the bath will be maintained in a molten state and flow back into the tank 29. In addition we provide one or more burners 41 for heating the discharge end 26 of the tin bath trough and also burners 42 for heating the receiving end of the cooling bath trough. Thus the tin carried on to the discharge end of the tinning bath trough will be maintained in a molten state so as to flow therefrom by means of the burners 41 while the tin freed from the bearings as they tumble into the receiving end of the cooling bath trough will be maintained also in a molten state so that it may readily flow through the openings 38 to the ingot 39. Obviously, if desired, and it will probably be considered more practical, these burners 40, 41 and 42 will be partially or completely enclosed not only for the purpose of protection but for conservation of the heat. It will furthermore be noted that the discharge end 26 of the tinning bath trough is spaced from the receiving end 25 of the cooling bath trough to provide a draft passage 43 for the flames from the adjacent burners.

In operation the bearings are placed on the receiving portion 25 of the trough 10 of the unit A, the pedals 23 moving the bearings along the trough into the acid solution in tank 28, the speed of the carrier 12 being arranged to afford time for the desired chemical action during the travel of the bearings through the acid bath. The bearings are thereafter moved along the trough out of the tank 28 to the discharge end 26 where the bearings are automatically transferred to the adjacent receiving end 25 of the trough of unit B. As previously mentioned, the bearings, as they tumble from the trough of the unit A to the trough of the unit B strike this latter trough with sufficient force to free the same of any excess acid which may be clinging thereto, which acid then passes through the opening 35 in the bottom of this latter trough into the gutter 36 and back through the leg 37 thereof to the acid tank 28. The pedals of the carrier associated with the unit B then engage the bearings and move them downwardly into the molten tin solution in the tank 29. Because of the water and air in the bearing castings, the bearings will, on their introduction to the tin solution, float, moving upwardly free from contact with the pedals 23, the pedals being carried beyond the floating bearings. It will be noted that the portions 23' which connect the pedals 23 with the carrier chain are relatively narrow as seen in Figure 6 whereby the floating bearings will be permitted to remain in the tin solution without being moved by the pedals. As soon as the moisture and air in the bearing castings have been driven therefrom, by reason of the molten tin, these bearings will sink in the tin solution and rest on the trough bottom where they will be picked up by the next on-coming pedal and moved along the trough out of the tin solution.

Hence they will be discharged to the receiving end of the trough of the unit C. During the discharge of the bearings from the trough of the unit B to that of the unit C the bearings will be deposited with some force, into the trough of the unit C so that any excess tin carried thereby will be freed therefrom and flow through the apertures 38 into the ingot 39. In a similar manner the bearings are moved longitudinally of the trough of unit C into tank 30 containing the cooling water which serves to cool the bearings and discharge them at the end of the trough of this last unit in a condition permitting their immediate handling. The discharge end of the water bath trough is provided with a regulable discharge apron 44 pivotally connected as at 45 to a part of the machine structure and has associated therewith supporting segments 46 pivotally connected thereto as at 47 and extending through guides 48. A locking lever 49 is pivotally mounted to the frame of the machine for selective engagement with a plurality of notches 50 in the supporting segment. Thus the delivering apron 44 may be held in any of these angular or inclined positions by the engagement of the locking lever 49 with the desired notch 50. The bearings as they leave the discharge end of the cooling bath trough tumble downwardly along this apron 44 for depositing in any one of a number of containers placed upon the floor adjacent the end of the machine. With this construction the bearings may be directed to any of the several containers arranged at various distances from the machine so that as one container becomes filled the apron may be adjusted to direct the bearings to another container while the filled container is being removed and replaced by an empty one. The locking lever 49 is preferably arranged so as to be operable from either side of the machine and as the lever or levers engage the segment 50 by gravity and as the apron 44 tends to swing downwardly by gravity, the aforedescribed adjustment may be accomplished with great rapidity.

Since the action of the tin solution reaches the proper point at the time of sinking of the bearings indicating that the air and moisture in the bearings have been driven off, it will be noted that we have provided means for automatically removing the bearings from the tin solution at the proper time without unduly slowing up the speed of the carrier 12 and without unduly heating the tin solution.

It will further be noted that providing the separate units A, B and C the pedals associated with the respective units do not contact with the solutions of the tanks associated with the other units.

The underlying principle of the present invention as disclosed in the illustrative embodiment herein shown and described, is capable of expression in numerous forms of construction and it should accordingly be understood that no limitation should be imposed upon the invention by reason of any of the details of construction or specific arrangements of parts herein shown and described. Reservation is therefore made to make such changes in the non-essential details of the invention as may come within the purview of the accompanying claims.

What we claim as our invention is:

1. In the method of treating bearings or the like, those steps which consist in introducing the bearings into a bath of molten tin through which a conveyor is running and permitting the bearings to float unmolested in the bath of tin until they sink into the zone traversed by said conveyor and removing the bearings from the bath by the conveyor.

2. In the method of treating cast articles containing moisture and air, those steps which consist in introducing the articles into a bath of molten tin wherein they are permitted to float unmolested until the heat of the molten bath drives off the moisture and air and thereafter removing the articles when they sink in the bath.

3. In the method of treating cast articles containing moisture and air, those steps which consist in introducing the articles into a bath of molten tin in which they float until the moisture and air has been driven out and removing the articles from said bath by a conveyor traversing said bath below the surface thereof, the articles sinking into the zone of said conveyor when the moisture and air is expelled.

4. In the method of treating bearings and the like, those steps which consist in successively introducing the bearings into baths of acid, molten tin and a cooling liquid, tumbling the bearings between each of the successive baths to free the same of excess material adhering thereto from the preceeding bath and salvaging the material thus freed.

5. The method of coating cast bearings or the like with tin which includes introducing the bearings into a bath of molten tin by conveying means movable through the bath below the surface thereof and permitting the bearings to float on the tin until the heat of the latter drives off the moisture and air whereupon the articles sink into the bath for movement through and out of the latter by the conveying means.

6. The method of coating cast articles with tin which includes introducing the articles into a trough extending into and out of the bath of molten tin, moving the articles into the tin bath by conveying means extending along the base of the trough permitting the articles to float on the surface of the tin without interference from the conveying means until the heat of the molten tin drives off the moisture and air whereupon the articles sink into the zone of the conveying means for movement thereby out of the tin bath and subsequently conveying the articles into a bath of cooling medium.

7. In the method of treating cast articles containing moisture and air, those steps which consist in automatically and successively moving the articles through baths of acid and tin and permitting the articles to remain floating in the tin bath until they sink before removing the same.

8. In the method of treating cast articles containing moisture and air, those steps which consist in introducing the articles into a bath of molten tin wherein they float until the heat of the molten bath drives off the moisture and air and automatically removing the articles from the bath of tin as soon as they sink in the latter.

9. In the method of treating cast articles containing moisture and air, those steps which consist in introducing the articles into a bath of molten tin wherein they float until the heat of the molten bath drives off the moisture and air, moving the articles out of the bath when they sink in the latter, removing any excess tin adhering to the articles and conveying the excess tin thus removed back to the tin bath.

CHARLES W. EGGENWEILER.
WILLIAM J. FIEGEL.